3,202,624
CHLOROPRENE POLYMER IN THE FORM OF ELONGATED PARTICLES
Chester Herbert Gelbert, Claymont, Del., assignor to E. I. du Pont de Nemours and Company, Wilmington, Del., a corporation of Delaware
No Drawing. Filed Dec. 28, 1960, Ser. No. 78,829
2 Claims. (Cl. 260—29.7)

This invention is directed to a novel chloroprene polymer elastomer in the form of small elongated particles suspended in water and to a process for making such suspensions and to valuable articles made therefrom.

Considerable success has been had in preparing aqueous suspensions of fiber-like particles of many synthetic polymeric materials and converting these suspensions, by methods used in paper-making industry, into useful sheet materials. The method used in making these fibers is usually to mix a solution of the polymer with another liquid which precipitates it, the conditions being adjusted so that the particles formed have the desired size and shape. When applied to elastomers, however, the resulting suspensions usually agglomerate even while being formed. Adding protective agents improves the stability of these suspensions but not to such an extent as to make them practical for industrial use. A new or modified procedure which will give stable suspension of the elastomer particles is therefore needed.

It is an object of the present invention to provide a novel stable suspension of chloroprene polymer elastomer particles. It is a further object of this invention to provide a process for preparing such a stabilized suspension.

These and other objects will become apparent in the following description and claims.

A preferred embodiment of the present invention involves a process for preparing stable aqueous suspensions of gel-type chloroprene polymer particles, with longest dimension less than about 1,000 microns, by adding an anionic latex of the elastomer under conditions of high shear to a precipitant made by mixing magnesium chloride and calcium chloride solutions with an excess of sodium hydroxide solution, said precipitant containing at least 0.05 mole of magnesium compounds and at least 0.0005 mole of calcium compounds.

When using the heretofore described precipitant, it is essential that it be used within about one day after preparation. On longer standing, especially when exposed to air, the precipitant becomes ineffective for producing a non-agglomerating slurry.

The suspensions formed according to the present invention from latices in which the elastomer is of the non-plastic gel type, insoluble in aromatic hydrocarbons, show no tendency to agglomerate on storage. The particles when collected on a screen do not adhere together when the water is removed by suction and hence the deposit at this stage has no substantial strength. On removing the bound water, however, either by evaporation or by applying pressure, a porous elastic sheet results.

By "gel-type chloroprene polymer" is meant a high molecular non-plastic polymer, not appreciably soluble in aromatic hydrocarbons such as benzene, but swollen thereby. Such polymers are made in substantial absence of so-called modifying or chain-transfer agents such as mercaptans.

More particularly, the present invention is directed to a suspension of particles with longest dimension less than about 1,000 microns of gel-type chloroprene polymer in water, being stable toward agglomeration and capable of forming a water-leaf of substantially no wet strength but convertible to a coherent elastic sheet on further removal of water. This invention also relates to a process for preparing a porous elastic sheet of chloroprene polymer by mixing a latex of gel type chloroprene polymer under conditions of high shear with a precipitant such as is described in the first definition above, collecting the particles as a sheet by filtration, removing water by suction and then further by evaporation or by the application of pressure.

Substantially no wet strength means that when the particles of the slurry are collected on a 100-mesh screen, and washed with water (while being temporarily protected by another screen), and the resulting sheet is removed from the supporting screen by "couching," that is, by placing the sheet with its supporting screen, sheet side down, on blotting paper, covering with blotting paper and rolling with a standard roll, the strength of the sheet, when promptly determined while still wet, is less than 0.017 pound per inch per ounce per square yard.

The term chloroprene polymer includes chloroprene homopolymer and copolymers of chloroprene in which the copolymerizing monomer ordinarily present to the extent of less than about 50% of the total, may be a diene such as butadiene, isoprene, bromoprene, fluoroprene, and 2,3-dichlorobutadiene, as well as the copolymerizable monoethylenically unsaturated compounds, such as styrene, acrylonitrile and methyl methacrylate. The latex used in the present invention may be compounded in the usual way, for example with the desired curing agents, reinforcing agents, pigments and antioxidants and the elastomer may be cured in the usual way by heating; compounding and curing, however, are not necessary. Since it is sometimes advantageous for the latex to have a high viscosity, thickening agents such as carboxyethyl cellulose and alginates may be added for the purpose or the latex may be used at a concentration, usually 60% or more at which it is inherently viscous.

The composition of the precipitant is critical. When less than the defined amount of calcium ion is used, the precipitate is too fine and, when less than the described amount of magnesium salt is used, large crumbs of polymer are formed or the entire body of latex may coagulate in a mass. The upper limits for calcium and magnesium are less critical but concentrations less than ten times those given in the definition are preferred. The sodium hydroxide used should be in excess of that required to react with all the magnesium chloride and preferably should be between 3 and 5 moles per mole of magnesium chloride. It is preferred also that the ratio of magnesium to calcium should be between 100 to 1 and 100 to 1.6.

The proportion of latex (of a given concentration) to be added to the precipitate depends upon the fineness of the precipitate desired and on the concentration of the precipitant. Thus as shown by Examples 1 and 2, increasing the ratio of latex to precipitant increases the particle size and finally leads to the formation of coarse crumbs. A more dilute precipitant precipitates much less polymer before reaching the stage at which coarse crumbs and the massive coagulum are formed.

In mixing latex and precipitant, it is important that there should be conditions of high shear. That is, at the surface of contact between the two liquids, one should be traveling at a much greater velocity than the other. This may be achieved, for example, by dropping a stream of the latex onto a surface of the precipitant which is moving at high velocity or by introducing the latex into a stream of the precipitant flowing at a high velocity. Such mixing operations may be carried out either as batch operations or continuously. Although the effect of temperature upon the precipitation is not important, it is ordinarily most convenient to carry out the precipitation at or near the ordinary temperature.

The elastomer particles of the dispersions concerned in the present invention are of irregular elongated outline, rather difficult to describe completely. They are sometimes cigar-shaped, with their length at least four times their width, and sometimes are branched and curved. They usually do not approach, however, the complex mass of fine, irregular, highly convoluted strands which are formed under special conditions of precipitation from solutions of fiber-forming polymers. The longest dimension of the particles is usually between about 0.5 and about 1,000 microns, measured in a straight line rather than along the particle itself, if curved. Ordinarily, in any given preparation, the range will be narrower; for example, 0.5 to 3 microns or 20 to 100 microns. The cohesion of the particles is believed to be largely due to the nature of their surfaces rather than to any entwinement due to shape.

The herein described suspensions of gel-type chloroprenepolymer are useful for forming sheets by the method disclosed herein for making molded articles by the slush-molding technique, using concentrated slurries, and as additives for a wide variety of aqueous dispersions. In this last use, the suspensions have the advantages that the electrolyte concentration may be reduced very low by washing, that the particles are without charge, and may be extremely fine. The porous, elastic sheets made above are of particular interest as battery separators and in various articles of wearing apparel, such as women's girdles, where the unusual combination of permeability and elasticity is especially valuable.

Representative examples illustrating the present invention follow.

*Example 1*

The precipitant used is made by adding of magnesium chloride and calcium chloride to a dilute sodium hydroxide solution so as to give a fine suspension of magnesium hydroxide containing sodium, chloride, and hydroxide ions as the principal ionic species. The total concentration of magnesium compounds is 0.095 molar and of calcium compounds is 0.0015 molar. To do this, 225 cc. of 2 normal sodium hydroxide, 225 cc. of 4% magnesium chloride and 100 cc. of 0.17% calcium chloride solution, both salts being on an anhydrous basis, are diluted with water to one liter. This precipitant is used within one day of the time when it is prepared. The latex used in this example is prepared by polymerizing chloroprene dispersed in an alkaline solution of a disproportionated rosin. The polymer formed is of the insoluble gel type and the concentration of the latex is 50%. It is compounded with 5 parts of zinc oxide and 2 parts of 4,4'-thiobis-(6-tertiary-butyl metacresol) antioxidant per 100 parts of polymer. The latex and the precipitant are mixed continuously in a vessel consisting of a length of pipe of one-inch inside diameter, with a pipe of one-tenth inch inside diameter opening into it and arranged coaxially. Six inches beyond the point of mixing there is a right angle bend in the one-inch pipe. The precipitant flows through the large pipe at a rate of 4,220 cc./min. and the latex is introduced through the smaller pipe at a rate of 640 cc./min. Polymer particles separate from the resulting slurry on standing and may be separated from the precipitant by decantation and further wasshing with water, in which the particles readily disperse to form a readily settling slurry. The particles are irregular elongated masses mostly about three hundred microns in their largest dimension. They are mostly retained on a sixty-mesh screen. When the water in which they have been suspended is removed by suction applied to the screen, the resulting water-leaf has little or no cohesion and strength. On further drying, however, either by applying pressure or passing air, preferably warm and dry, through the water-leaf on the screen, a coherent self-supporting porous film is formed which may easily be removed from the screen.

*Example 2*

Example 1 is repeated with the flow of latex through the small pipe reduced to 300 cc./min. and the flow of precipitant increased somewhat to 4,450 cc./min. The irregular, elongated particles from the resulting slurry are much finer but still settle and may be washed as in Example 1. The slurry is not retained by a two hundred mesh screen and even passes largely through ordinary filter paper. The longest dimension is about 3 microns, and the shortest about 0.5 micron. When the flow of latex is 460 cc./min., the particles are intermediate between those of preceding Example 1 and Example 2.

The precipitant used in the practice of the present invention, as made by adding an excess of sodium hydroxide to a mixture of calcium chloride and magnesium chloride solutions, is essentially a solution of sodium chloride, sodium hydroxide and calcium hydroxide, containing fine particles of solid magnesium hydroxide in suspension. The latter appears to act as a stabilizing agent for the fine particles of chloroprene polymer formed by the action of the ions from the sodium chloride, calicum hydroxide and sodium hydroxide, particularly the calcium ions. The essentials of the composition can therefore be defined in terms of the number of moles of magnesium and of calcium compounds used in making a liter of the precipitant. Put another way, the precipitant contains at least 1.2 grams of magnesium and 0.02 gram of calcium per liter. Instead of magnesium chloride, other magnesium salts may be used provided that they are soluble in water and do not form precipitates with the calcium. For example, magnesium bromide, iodide, nitrate, acetate and sulfate are suitable at the calcium concentrations used. Similarly, calcium chloride may be replaced by other calcium salts provided that they are soluble in water and compatible with the other ingredients. Sodium hydroxide may be replaced by other strong bases such as potassium hydroxide, lithium hydroxide and tetramethyl-ammonium hydroxide.

It is understood that the preceding representative examples may be varied, by one skilled in the art as to reactants and conditions within the scope of the total specification disclosure, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing a porous elastic sheet of chloroprene polymer gel particles of elongated shape, said process comprising mixing a latex of chloroprene polymer under conditions of high shear with a precipitant, said high shear being that which is sufficient to produce said elongated shape, said precipitant being made prior to said mixing by mixing magnesium chloride and calcium chloride solutions with an excess of sodium hydroxide solution, said precipitant containing at least 0.05 mole of magnesium compounds and at least 0.0005 mole of calcium compounds per liter, said mixing of latex and precipitant being followed by collecting said particles of elongated shape as a sheet by filtration, then removing water by suction, and then drying said sheet.

2. A process for preparing stable aqueous suspensions of chloroprene polymer gel particles of elongated shape, said particles having their longest dimension less than 1000 microns, with said longest dimension being at least four times the width of said particles, said process comprising adding an anionic latex of chloroprene polymer under conditions of high shear to a precipitant, said high shear being that which is sufficient to produce said elongated shape, said precipitant being made prior to said adding by mixing magnesium chloride and calcium chloride solutions with an excess of sodium hydroxide solution, said precipitant containing at least 0.05 mole of magnesium compounds and at least 0.0005 mole of calcium compounds per liter.

References Cited by the Examiner

UNITED STATES PATENTS

| | | | |
|---|---|---|---|
| 2,115,561 | 4/38 | Ogiby | 260—821 |
| 2,419,512 | 4/47 | Vesce | 260—29.7 |
| 2,424,648 | 7/47 | Bixby | 260—23.7 |

MURRAY TILLMAN, *Primary Examiner.*

DONALD ARNOLD, LEON J. BERCOVITZ, WILLIAM H. SHORT, *Examiners.*